US006266173B1

(12) United States Patent
Hayes

(10) Patent No.: US 6,266,173 B1
(45) Date of Patent: Jul. 24, 2001

(54) OPTICAL FM RECEIVER

(75) Inventor: Robert R. Hayes, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/420,629

(22) Filed: Oct. 20, 1999

(51) Int. Cl.$^7$ ................................................ H04B 10/06
(52) U.S. Cl. .......................... 359/189; 359/119; 359/195
(58) Field of Search .................................. 359/189, 182, 359/140, 181, 161, 195, 119

(56) References Cited

U.S. PATENT DOCUMENTS

| 5,245,461 | * | 9/1993 | Fitzmartin | 359/195 |
| 5,742,714 | | 4/1998 | Byron | 385/27 |
| 5,786,913 | * | 7/1998 | Pfeiffer | 359/119 |

FOREIGN PATENT DOCUMENTS

| 0 473 873 | 3/1992 | (EP) . |
| 0 591 866 | 4/1994 | (EP) . |
| 00/51271 | 8/2000 | (WO) . |

OTHER PUBLICATIONS

Kalman, R.F. et al., "Dynamic Range of Coherent Analog Fiber–Optic Links," Journal of Lightwave Technology, vol. 12, No. 7, (Jul. 1994), pp. 1263–1277.

Hirano, A. et al., "All–optical limiter circuit based on four–wave mixing in optical fibres," Electronics Letters, vol. 34, No. 14 (July 9, 1998) pp. 1410–1411.

Sorin, W.S. et al., "Frequency Domain Analysis of an Optical FM Discriminator," Journal of Lightwave Technology, vol. 10, No. 6, (Jun. 1992), pp. 787–793.

Swanson, E.A. et al., "High sensitivity optically preamplified direct detection DPSK receiver with active delay–line stabilization," IEEE Photonic Tech. Lett. vol. 6, (1994) pp. 263–265.

* cited by examiner

Primary Examiner—Jason Chan
Assistant Examiner—Chau M. Nguyen
(74) Attorney, Agent, or Firm—Ladas & Parry

(57) ABSTRACT

A method and apparatus for converting a frequency modulated lightwave into an electrical signal that is proportional to instantaneous frequency deviations of the frequency modulated lightwave. The frequency modulated lightwave is amplified by an amount equal to or greater than a desired FM processing gain to provide an amplified frequency modulated lightwave. The amplified lightwave is filtered to restrict amplifier noise added to the frequency modulated lightwave to provide a filtered lightwave. The amplitude of the filtered lightwave is limited to remove unwanted amplitude fluctuations to provide a limited lightwave. The limited lightwave is split into a first split lightwave and a second split lightwave. The second split lightwave is delayed relative to the first split lightwave, to provide a delayed second split lightwave. The delayed second split lightwave is combined with the first split lightwave to provide:(1) a sum of first split lightwave fields and delayed second split lightwave fields, and (2) a difference of the first split lightwave fields and the delayed second split lightwave fields, the splitting, delaying and combining providing the sum and the difference having fields with parallel polarizations. The sum is detected by a first photodetector and the difference is detected by a second photodetector, the first photodetector and second photodetector being connected in series with a common terminal therebetween, the common terminal providing to a following amplifier a difference current that is proportional to a difference between first photodetector curent and second photodetector current, the difference current being proportional to instantaneous frequency deviation of the frequency modulated lightwave.

8 Claims, 1 Drawing Sheet

OPTICAL FM RECEIVER

FIELD OF THE INVENTION

This invention relates to the field of communications, and, in particular, to optical devices for satellite communications systems.

BACKGROUND

Orbiting satellites are an important aspect of modern communication systems. Originally used for "single-bounce" communication, with a signal going up from one place on the surface of the earth and coming down in another, communication satellites are now being used to form complex networks in space, with each satellite in the network being able to communicate with many, but not all, of the other satellites. Optical inter-satellite links, with their high directionality, high energy efficiency, and tremendous information bandwidth, allow satellites to talk to one another, and to transmit a much larger amount of information. Optical Frequency Modulation (FM) links, a new concept, offer a way to transmit not only digital signals, but also analog signals, and to do this with a much higher signal quality than was heretofore possible. However, effective optical FM links have not yet been demonstrated primarily because of the lack of appropriate photonic components, such as FM optical sources, limiters, discriminators, and receivers.

The primary function of most of these systems is to transport analog information data from one point to another. It would be very beneficial to have an approach that provided for the transport of this data in its original format, without having to convert it first into a digitally encoded bit stream, and then reconverting upon reception. Conventional modulation schemes do not have sufficient Signal to Noise Ratio (SNR) to allow this, which is why the majority of this data is digitally encoded before transport. However, FM techniques offer a "processing gain" that can increase the SNR by 20 dB or more, thus allowing direct analog transmission of the data in many of these applications. This offers a considerable simplification in system hardware, an increase in system flexibility, and a reduction in cost.

Optical links using FM and Phase Modulation (PM) have been discussed in the article by R. F. Kalman, J. C. Fan, and L. G. Kazovsky, entitled "Dynamic Range of Coherent Analog Fiber-Optic Links", J. Of Lightwave Technology, Vol. 12, p. 1263 (1994). Their approach uses a conventional technique employing a local oscillator offset from the signal frequency by a difference equal to the Intermediate Frequency (IF), together with a limiter, a filter, and an envelope detector.

Referring to prior art FIG. 1, input signal 10 is combined with light 12 from a local oscillator (lo) laser at directional coupler 14. The combined signal is mixed at photodetector 16, amplified at IF amplifier 18, (optionally) filtered by filter 19, limited by limiter 20, split into a delayed and undelayed signal, with the two signals (delayed and undelayed) being mixed (multiplied together) in a final RF mixer 23. To get an FM processing gain, the system shown in FIG. 1 must have an IF that is much larger than the baseband modulation frequency. The square of the ratio of the IF frequency to the baseband bandwidth is the SNR improvement that one gets with the FM approach. Therefore, if 20 dB of noise suppression is desired, and if there is a baseband bandwidth of 20 GHz, an IF frequency of 200 GHz and a bandwidth for all the IF components of twice this, namely, 400 GHz, are needed. Amplifiers, limiters and envelope detectors that operate over a 400 GHz bandwidth simply do not now exist, so that such a system cannot be presently realized.

Therefore, there exists a need for an effective FM receiver to help further realize optical FM inter-satellite links. The present invention provides a unique solution for such need by providing an all-optical FM receiver that performs the same function in the optical domain that a conventional FM receiver performs in the Radio Frequency (RF) domain.

SUMMARY OF THE INVENTION

A preferred embodiment of the invention includes an optical amplifier, optical filter, optical limiter, an optical delay-line discriminator and dual-balanced photodetectors that are assembled to form a system that converts an incoming lightwave having frequency modulation into an electrical signal that is proportional to the degree of phase or frequency deviation. The system thus performs the same function in the optical domain that a conventional FM receiver performs in the RF domain without the use of an IF stage. This lack of an IF stage provides the difference between a practicable system, and one that is an unrealizable mathematical curiosity.

The present invention allows an FM optical communication link to have all of the benefits of wide-band FM without the need for an IF stage. The elimination of the IF stage allows the link to operate at the highest frequencies achievable with today's photodetectors and microwave amplifiers (e.g., 40 GHz), while simultaneously achieving a high degree of noise suppression. The invention further allows the discriminator to be operated in a way that leads to high linearity. The result is a system that will have superior noise properties and low distortion. It is thus an ideal technique for optical inter-satellite communication systems requiring high Spur Free Dynamic Range (SFDR).

In accordance with a preferred embodiment of the present invention a method and apparatus for converting a frequency modulated lightwave signal into an electrical signal that is proportional to the frequency deviation of the frequency modulated lightwave signal is provided. The frequency modulated lightwave signal is split into a first split lightwave signal and a second split lightwave signal by a 50:50 4-port directional coupler (such as any of the single-mode couplers manufactured by Gould Fiber Optics, Inc.). The second split lightwave is shifted 90° in phase (or an odd multiple thereof) with respect to the first split lightwave by the delay length τ. The first split lightwave and the second delayed split lightwave are then recombined in a second 50:50 directional coupler, in which the fields combine to give the sum of the delayed and undelayed fields at one directional coupler output port, and the difference of the delayed and undelayed fields at the other directional coupler output port. The two output ports of this 4-port coupler are then directed to a first and second photodetector, respectively. The first photodetector and the second photodetector are connected in series with a common terminal therebetween. The common terminal provides a photodetector current proportional to an instantaneous frequency deviation of the carrier frequency. The frequency modulated lightwave is received by an optical amplifier that provides an amplified lightwave signal. Amplitude fluctuations and noise in the amplified lightwave signal can be reduced to provide an adjusted lightwave signal to be split into the first split lightwave signal and a second split lightwave signal. An input of a microwave amplifier is coupled to the common terminal to amplify the photodetector current proportional to the instantaneous frequency deviation. Thermally controlled mediums can be provided in which the first split lightwave signal and the delayed second split lightwave signal propagate.

DETAILED DESCRIPTION

Figure 2:
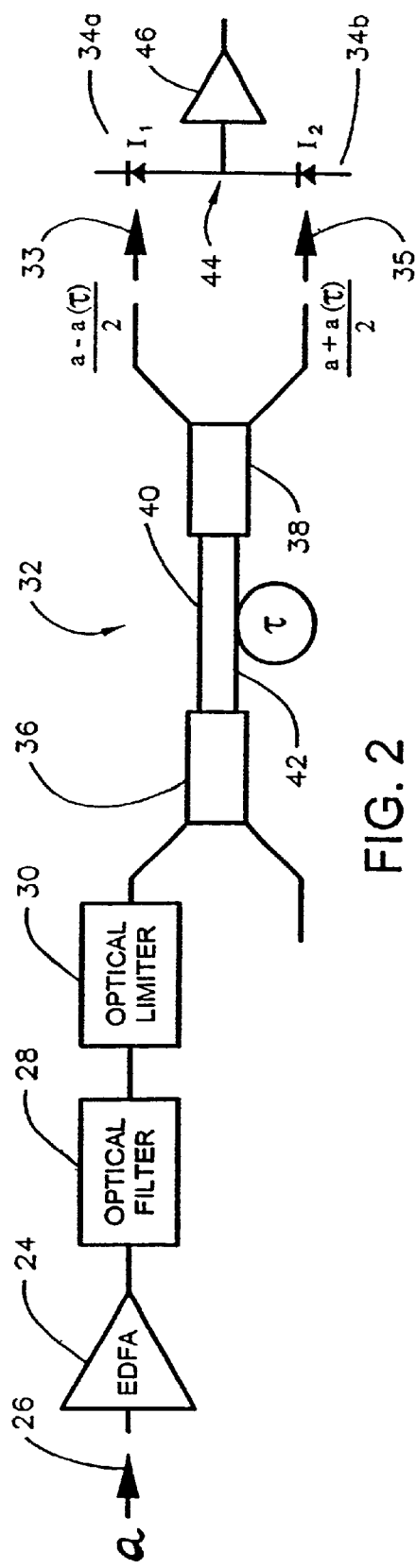
FIG. 2 shows in schematic block diagram form an embodiment of the present invention.

Referring to FIG. 2, an embodiment of the present invention is shown. Optical amplifier 24, such as an Erbium Doped Fiber Amplifier (EDFA) (for example, any of the series FAF devices manufactured by National Optics Institute, Canada), receives signal 26, designated "a", a frequency-modulated signal whose instantaneous frequency is always within the passband of the optical amplifier, and increases the level of signal 26 by an amount that is at equal to or greater than the desired FM processing gain. Hence, if the deviation frequency and signal bandwidth is chosen to achieve a 20 dB of processing gain, then the optical amplifier gain must be equal to or greater than 20 dB. Bandpass optical filter 28, such as any of the Micron Optics FFP-TF series devices, is coupled to the output of optical amplifier 24 to restrict the noise coming from the optical amplifier. Optical limiter 30 is coupled to the output of optical filter 28 to eliminate or greatly reduce amplitude fluctuations. This limiter must not convert amplitude fluctuations into phase fluctuations, for if it does, the FM processing gain will be reduced or lost entirely. All-optical delay-line discriminator 32 and dual-balanced photodetectors 34a, 34b, (such as the NTT Electronics Corp, model NEL KEPD2552KY6), which produce currents $I_1$ and $I_2$ respectively, convert the frequency variations impressed on the carrier into an electrical signal that reproduces the modulation on the carrier.

Delay line discriminator 32 (such as any of the FDM Series devices manufactured by Photonic Integration Research, Inc.) is an interferometer that consists of two 3 dB splitters 36, 38 connected by two unequal lengths of optical waveguide 40, 42, typically, but not necessarily, optical fiber. The difference in lengths gives the delay time, $\tau$. Based upon transfer equations for a 4-port directional coupler, signal 33 becomes half of the original signal "a" minus its delayed counterpart, while signal 35 becomes half of the original signal "a" plus its delayed counterpart. This sunning and differencing of signal "a" and its delayed version leads to an interferometric switching of the light. If, for example, delayed signal 35 is 180° out of phase with the non-delayed signal 33, all of the light will be incident upon photodetector 34a and none will be incident upon photodetector 34b. Conversely, if the original and delayed signals are in-phase, all of the light will be incident upon photodetector 34b, and none will be incident upon photodetector 34a.

Photodetectors 34a and 34b are connected in series, with common terminal 44 feeding the input of microwave amplifier 46 (such as any of the Avantek-HP series AFT low-noise, 50 Ohm amplifiers having the desired signal bandwidth). As connected, the configuration has infinite common-mode rejection, i.e., if both photodetectors have equal illumination, no current will flow into microwave amplifier 46, the current from photodetector 34a simply flowing through photodetector 34b into its biasing supply (not shown). However, if the photodetectors are unequally illuminated, the difference in the currents will flow into or out of microwave amplifier 46. Using the fact that the current in each photodetector is proportional to the square of the optical amplitudes, a(t), the current difference can be expressed as:

$$I_1 - I_2 = \frac{1}{4}\langle(a(t) - a(t-\tau))^2\rangle - \langle(a(t) + a(t-\tau))^2\rangle = -\langle a(t)a(t-\tau)\rangle$$

where the angular brackets represent a time average over several optical cycles.

To show that such a peculiar arrangement does indeed function as a frequency discriminator, consider an optical signal having either phase or frequency modulation, i.e., $$a(t) = a_0\cos(\omega_0 t + \phi(t))$$

To make the discriminator work, the delay line length, which provides delay time $\tau$, must be adjusted so that it corresponds to a 90° phase shift (or some odd multiple thereof) for the carrier frequency, $\omega_0$. The difference current at microwave amplifier 46 is then given by $$I_1 - I_2 = a_0^2 \langle \cos(\omega_0 t + \phi(t)) \sin(\omega_0 t + \phi(t-\tau))\rangle$$

Using trigonometric relations to expand this into a sum and difference of the arguments, one finds that $$I_1 - I_2 = \frac{1}{2}a_0^2\sin(\phi(t) - \phi(t-\tau)) + a_0^2\langle\sin(2\omega_0 t + \phi(t) + \phi(t-\tau))\rangle$$

Because of the averaging over several optical cycles, the second term vanishes. If the argument of the first term is sufficiently small to allow on to approximate sin x by x, then $$I_1 - I_2 = \frac{1}{2}a_0^2(\phi(t) - \phi(t-\tau)) \cong \frac{1}{2}a_0^2\frac{d\phi}{dt}\tau = \frac{1}{2}a_0^2\omega(t)\tau$$

which shows that the photodetector current difference is proportional to the instantaneous frequency deviation of the carrier.

Maintaining the length difference in the two branches of delay line discriminator 32 can be accomplished either by thermally tuning the lengths with a small heater wire wrapped around one of the fibers, or by using piezoelectric line stretchers, as has been demonstrated by Swanson et al (referenced below). Such control is needed to insure that the phase difference of 90° or some odd multiple thereof is maintained at all times. Because of the short optical wavelength involved, the optical path length difference must be held to less than a small fraction of one micron.

This discriminator has been demonstrated on all-optical DPSK communication systems as described in the article by E. A. Swanson, J. C. Livas, and R. S. Bondurant, entitled "High sensitivity optically preamplified direct detection DPSK receiver with active delay-line stabilization", IEEE Photonics Tech. Lett Vol. 6, p. 263 (1994), and has been analyzed in the article by W. S. Sorin et al, entitled "Frequency Domain Analysis of an Optical FM Discriminator", Journal of Lightwave Technology, Vol. 10, p. 787 (1992).

Figure 1:
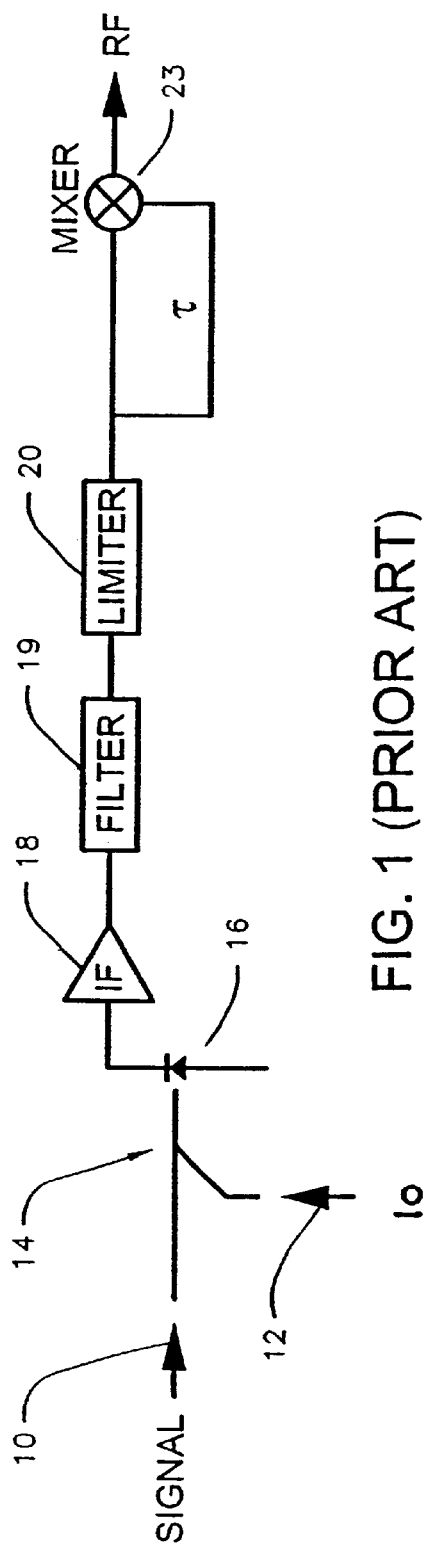
FIG. 1 shows in schematic block diagram form a conventional optical FM receiver.

As established above, the combination of delay line discriminator 32 and dual photodetectors 34a, 34b give an output signal that is proportional to sin ($\phi$(t)−$\phi$(t+$\tau$)), where $\phi$(t) is the phase modulation on the carrier. This sinusoidal response is a direct consequence of mixing a sine wave and its delayed counterpart in a square law device, and is the expected output for a balanced phase detector. The fact that it is the sine of the difference in phases, and not just the difference, produces distortion in the signal if the phase difference is sufficiently large. This distortion can be reduced by shortening the length of the delay line. This is an option that the conventional approach does not provide. For the prior art system shown in FIG. 1, the delay line length is fixed at a delay that corresponds to a 90° phase shift at the IF frequency (in order to insure quadrature). For the all-optical approach in accordance with the present invention, the delay line length need only be that of a 90° phase shift at the optical frequency, plus any integer number of lengths corresponding to a 180° phase shift (also at the optical frequency). For all practical purposes, the delay line can then have whatever length is desired.

Shortening the delay line length has several effects. First, it reduces the output signal strength. Second, it reduces the output noise, and it does this in such a way that the SNR is held constant. Third, it makes the argument in the sin $\phi(t)-\phi(t+\tau))$ term smaller, so that one is operating in the more linear region of the sine curve. Therefore, reducing the delay length holds the SNR constant, but reduces the distortion in the output signal. The significance of this is that the Spur Free Dynamic Range (SFDR) of the system is increased, a highly desirable characteristic for high dynamic range applications.

However, the delay line length cannot be shortened without limit. At some point, the photonic shot noise in the photodetectors or the unsuppressed amplitude noise due to an imperfect limiter will become larger than the residual phase noise. Shortening the delay line beyond this point will decrease the SNR, which is undesirable.

The all-optical FM receiver in accordance with the present invention provides the well-known "FM advantage", i.e., an increase in the SNR that is equal to the square of the ratio of the FM deviation to the baseband frequency, and does this without requiring an IF. The elimination of the IF stage allows one to implement this approach at the highest frequency at which photodetectors and microwave amplifiers can function (currently about 40 GHz), and to do this with whatever FM advantage one desires (limited only by thresholding criterion). By comparison, the conventional approach of FIG. 1, with an FM advantage of 20 dB, could not be realized above 2 Ghz. An added benefit of all-optical approach is that it also allows for the optimization of the delay line length for reduced signal distortion.

Fitzmartin (U.S. Pat. No. 5,245,461) teaches that one can achieve optical FM without an IF using a scheme that incorporates a local oscillator laser. However, an analysis of Fitzmartin's scheme shows that the signal generated at the output is proportional to:

$$\sin \phi(t) - \sin \phi(t-\tau) \quad (1)$$

This result is quite different from the result in accordance with the present invention, which has an output proportional to:

$$\sin[\phi(t)-\phi(t-\tau)] \quad (2)$$

When the phase angles, $\phi$, are small, $\sin\phi(t)$ is approximately equal to $\phi(t)$, and the two results are approximately equal. However, for wideband FM, where one requires large frequency excursions (and hence large phase excursions) to get a large FM processing gain, $\phi(t)$ and $\phi(t-\tau)$ will not be small, and in fact will be many, many radians. Therefore, the Analog Optical FM Receiver proposed by Fitzmartin will not provide an output that is proportional, in any sense, to the instantaneous frequency of the optical wave, when the instantaneous phase deviation is larger than a radian or so. Simply put, it will not work for any system requiring an FM processing gain larger than unity.

By contrast, the phase angles in equation (2) (in accordance with the present invention) can be large, as long as the difference between the phase angle and its delayed counterpart is small. This condition can always be insured by making the delay, $\tau$, sufficiently short. As shown earlier, shortening the delay in accordance with the discriminator of the present invention does not degrade system performance, but actually enhances it by improving discriminator linearity.

Those skilled in the art can appreciate that alternatives or variations to the embodiment described herein can be made. For example, an embodiment of the system could also be configured with a single photodetector at one of the output ports of discriminator 32, but having two photodetectors eliminates the DC offset, and doubles the amplitude of the output signal. The order of the optical filter and optical limiter can be reversed, placing the filter after the limiter.

What is claimed is:

1. A method of converting a frequency modulated lightwave into an electrical signal that is proportional to instantaneous frequency deviations of the frequency modulated lightwave, comprising the steps of:

amplifying the frequency modulated lightwave by an amount equal to or greater than a desired FM processing gain to provide an amplified frequency modulated lightwave;

filtering the amplified frequency modulated lightwave to restrict amplifier noise added to the frequency modulated lightwave to provide a filtered amplified frequency modulated lightwave;

limiting the amplitude of the filtered frequency modulated lightwave to remove unwanted amplitude fluctuations to provide a limited filtered amplified frequency modulated lightwave;

splitting the limited filtered amplified frequency modulated lightwave into a first split lightwave and a second split lightwave;

delaying the second split lightwave relative to the first split lightwave, to provide a delayed second split lightwave;

combining the delayed second split lightwave with the first split lightwave to provide:
a sum of first split lightwave field and delayed second split lightwave field, and
a difference of the first split lightwave field and the delayed second split lightwave field;

the steps of splitting, delaying and combining providing the sum and the difference having fields with parallel polarizations; and detecting the sum by a first photodetector and the difference by a second photodetector, the first photodetector and second photodetector being connected in series with a common terminal therebetween, the common terminal providing to a following amplifier a difference current that is proportional to a difference between first photodetector curent and second photodetector current, the difference current being proportional to instantaneous frequency deviation of the frequency modulated lightwave.

2. The method of claim 1 wherein the limited filtered frequency modulated lightwave is split into a first split lightwave and a second split lightwave by a first 50:50 directional coupler.

3. The method of claim 1 wherein the second split lightwave is delayed relative to the first split lightwave by using a longer path length for the second split lightwave than for the first split lightwave.

4. The method of claim 1 wherein the delayed second split lightwave and first split lightwave are combined by a second 50:50 directional coupler.

5. An apparatus for converting a frequency modulated lightwave into can electrical signal that is proportional to instantaneous frequency deviations of the frequency modulated lightwave, comprising:

an amplifier for receiving and amplifying a frequency modulated lightwave by an amount equal to or greater than a desired FM processing gain to provide an amplified frequency modulated lightwave;

a filter coupled to an output of the amplifier for filtering the amplified frequency modulated lightwave to restrict amplifier noise added to the frequency modulated lightwave to provide a filtered amplified frequency modulated lightwave;

a limiter coupled to the output of the filter for limiting the amplitude of the filtered amplifed frequency modulated lightwave to remove unwanted amplitude fluctuations to provide a limited filtered amplified frequency modulated lightwave;

a discriminator coupled to the limiter, the discriminator splitting the limited filtered amplified frequency modulated lightwave into a first split lightwave and a second split lightwave, delaying the second split lightwave relative to the first split lightwave, to provide a delayed second split lightwave, and combining the delayed second split lightwave with the first split lightwave to provide:

a sum of first split lightwave field and delayed second split lightwave field, and a difference of the first split lightwave field and the delayed second split lightwave field, the discriminator providing the sum and the difference having fields with parallel polarizations;

a first photodetector responsive to the sum, and a second photodetector responsive to the difference, the first photodetector and second photodetector being connected in series with a common terminal therebetween, the common terminal providing to a following amplifier a difference current that is proportional to a difference between first photodetector curent and second photodetector current, the difference current being proportional to instantaneous frequency deviation of the frequency modulated lightwave.

6. The apparatus of claim 5 wherein the limited filtered frequency modulated lightwave is split into a first split lightwave and a second split lightwave by a first 50:50 directional coupler.

7. The apparatus of claim 5 wherein the first split lightwave is delayed relative to the second split lightwave by a longer path length for the second split lightwave than for the first split lightwave.

8. The apparatus of claim 5 wherein the delayed second split lightwave and first split lightwave are combined by a second 50:50 directional coupler.

* * * * *